United States Patent [19]

Holden et al.

[11] Patent Number: 5,438,868
[45] Date of Patent: Aug. 8, 1995

[54] NONINVASIVE ULTRASONIC LIQUID LEVEL INDICATOR

[75] Inventors: James Holden; David J. McNally, both of Sandy, Utah

[73] Assignee: Zevex, Inc., Salt Lake City, Utah

[21] Appl. No.: 146,414

[22] Filed: Nov. 1, 1993

[51] Int. Cl.⁶ .............................................. G01F 23/28
[52] U.S. Cl. ................................. 73/290 V; 342/124; 367/908
[58] Field of Search ........................ 340/621; 367/908; 73/290 V; 324/637, 644; 342/124

[56] References Cited

U.S. PATENT DOCUMENTS

| | | | |
|---|---|---|---|
| 3,987,674 | 10/1976 | Baumoel | 73/194 A |
| 4,144,517 | 3/1979 | Baumoel | 73/290 V X |
| 4,183,007 | 1/1980 | Baird | 367/908 X |
| 4,280,126 | 7/1981 | White | 340/621 |
| 4,580,448 | 4/1986 | Skrgatic | 73/290 V |
| 5,121,628 | 6/1992 | Merkl et al. | 73/290 V |
| 5,295,120 | 3/1994 | McShane | 367/908 X |
| 5,303,585 | 4/1994 | Lichte | 73/290 V |

FOREIGN PATENT DOCUMENTS

| | | | |
|---|---|---|---|
| 3241033 | 5/1984 | Germany | 73/290 V |
| 3012 | 1/1986 | Japan | 73/290 V |

Primary Examiner—William A. Cuchlinski, Jr.
Assistant Examiner—Willie Morris Worth
Attorney, Agent, or Firm—Thorpe North & Western

[57] ABSTRACT

A noninvasive ultrasonic liquid level indicator for indicating the level of a liquid in a reservoir is disclosed which comprises an ultrasonic transducer assembly, structures for holding the transducer assembly in a dry coupled attachment with the reservoir at selectable locations against an exterior surface of the reservoir, and a monitor for revealing a change in liquid height. The transducer assembly conveys signals regarding changes in liquid height to a monitor which warns the user in time to add more liquid or replace the reservoir before the liquid supply "runs dry." The manners for holding the assembly in place include, but are not limited to, a strap, a clamp, or adhesive material, such as tape. These allow the user to selectively place the transducer assembly along the reservoir at the desired triggering point.

12 Claims, 7 Drawing Sheets

NONINVASIVE ULTRASONIC LIQUID LEVEL INDICATOR

BACKGROUND OF THE INVENTION

This invention relates to an apparatus for the noninvasive measurement of liquids within a reservoir. In particular, the invention relates to a mechanism for measuring the height of a liquid and/or the occurrence of a liquid draining below a certain point so as to warn the user when additional liquid must be added or the reservoir replaced.

Medical science often requires that liquids be administered to a patient in a variety of situations. These liquids include simple intravenous feeding solutions, saline solutions for providing pressure to the eye during ocular surgery, contrast media infused to enhance imaging abilities, and blood administered during transfusions. In virtually all such situations, it could be dangerous for the liquid supply to "inadvertently run dry." In some applications, allowing the reservoir to run dry may decrease the pressure on the liquid below that desired. In other situations, it can result in air entering the blood stream, causing complications or even death.

Several approaches have been suggested for monitoring reservoirs of liquids so that inadvertent "running dry" can be avoided. For example, a system marketed by Trek Medical in Mukwanago, Wis., involves use of an electrical needle skewered into the bottom of a bottle containing liquid to be monitored. A constant electrical current is applied to the needle, and when the liquid level drops below the end of the needle, the break in the electrical current causes a lamp to light on a master control panel.

While the Trek Medical system works, it has several disadvantages. First, a separate needle is generally used for each monitored bottle. Second, the fixed location of the needle results in the fixed triggering position. Thus, the user cannot select the liquid level at which the system will signal that the reservoir needs to be refilled or replaced. While a fixed location may be desirable for some uses, the desired triggering position of the indicator may vary for different medical procedures. Additionally, some procedures may benefit from being able to vary the location at which the indicator signal reacts during different periods of the procedure. A third disadvantage of the above-mentioned system is that the placement of the needle risks the introduction of microbes and other contaminants that are generally undesirable in medical procedures.

Other available systems, marketed by Sarns, Inc. and CGH Medical, have ultrasonic liquid level detectors for blood reservoirs in which the transducer is placed against an exterior sidewall of the reservoir. Ultrasonic signals are emitted into the reservoir and reflected signals are used to determine when the liquid level has dropped below a designated point. The coupling between the transducer and reservoir sidewall, however, requires that gel be placed on the sidewall to conduct the ultrasonic signals from the transducer into the reservoir and from the reservoir back into the transducer. This approach can be time consuming and messy as gel must be applied to the transducer or sidewall each time the two are coupled.

SUMMARY OF THE INVENTION

It is an object of the invention to provide a noninvasive liquid level indicator especially suitable for medical applications requiring care in the administration of liquids.

It is another object of the invention to provide a noninvasive liquid level indicator which may be easily installed on and removed from reservoirs containing the liquid to be monitored.

It is a further object of the invention to provide such a noninvasive liquid level indicator which, when installed on reservoirs, does not require the use of ultrasonic gel or couplant.

It is an additional object of the invention to provide such a noninvasive liquid level indicator which may be readily adjusted for measuring different and selectable "triggering" levels in a reservoir.

These and other objects of the invention are realized in a liquid level indicator which includes an ultrasonic transducer. The transducer is surrounded by an elastomeric facing layer to enable it to firmly contact an exterior surface of a liquid accommodating reservoir. The transducer transmits an ultrasonic signal into the reservoir and receives back reflected signals. The transducer is coupled to a monitor which measures the time between production of the ultrasonic signal and receipt, if any, of the reflected signal. When the time between production and receipt back of the signal changes due to a change in the liquid level in the reservoir, the monitor emits an indicator signal, warning the user the liquid has dropped below the designated point.

The transducer assembly can be selectively located along the reservoir by using a strap or clamp which holds the transducer assembly against the reservoir, or by adhesively attaching the assembly to the reservoir. The appropriate method of attaching the transducer assembly, as well as the point of attachment, depends on the specific characteristics of the desired application.

BRIEF DESCRIPTION OF THE DRAWINGS

The above and other objects, features and advantages of the invention will become apparent from a consideration of the following detailed description presented in connection with the accompanying drawings.

DETAILED DESCRIPTION

Figure 1:
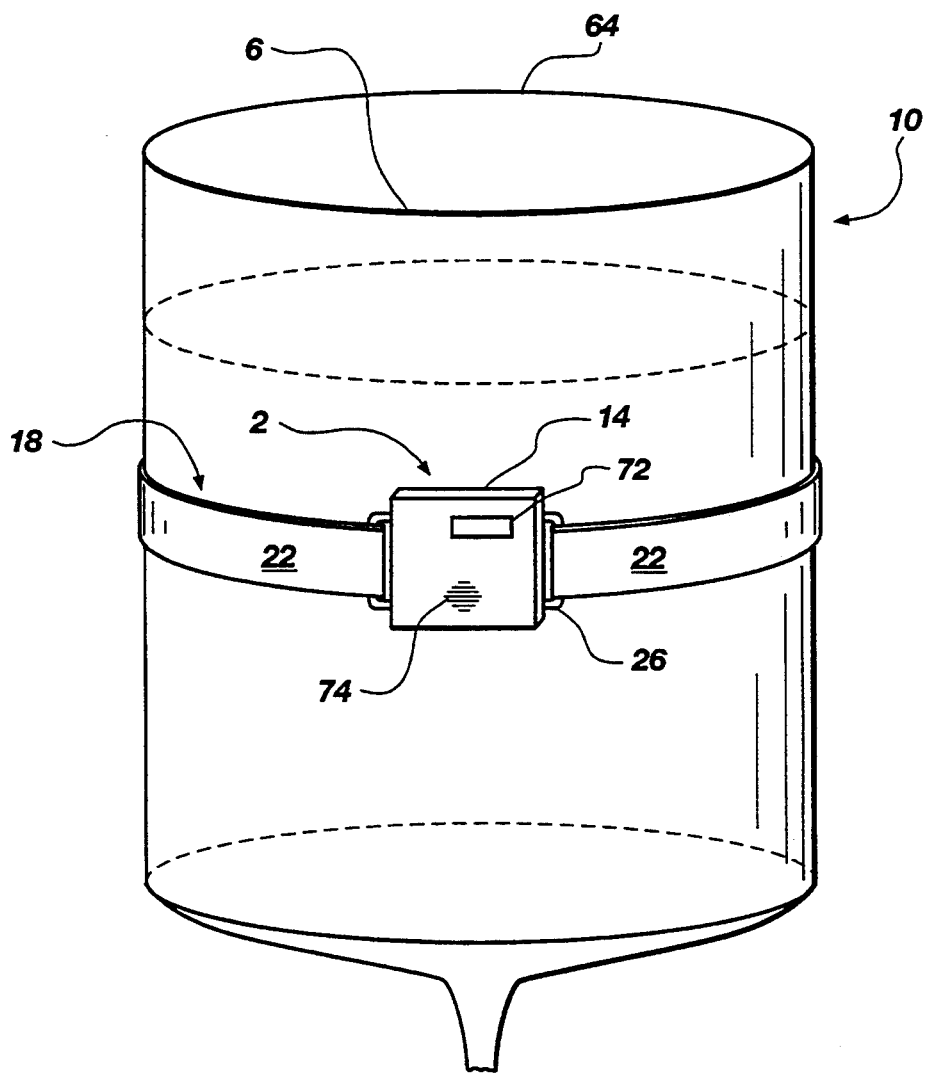
FIG. 1 shows a perspective view of one embodiment of a liquid level indicator made in accordance with the present invention, with a reservoir.

Referring to the drawings:

FIG. 1 shows a noninvasive liquid level indicator 2 made in accordance with the present invention mounted about an exterior sidewall 6 of a reservoir 10. The indicator 2 includes a transducer housing 14, one side of which is held against the sidewall 6 of the reservoir 10 by a tether or strap coupler 18.

The tether or strap coupler 18 includes a strap 22 joined to the sides of the housing 14 in any conventional fashion, such as by the loops 26. The strap 22 can be made of a single resilient piece, or can have two pieces, each piece being connected at one end to the transducer housing 14, and at least one of the pieces having an attachment/adjustment mechanism, such as a cam buckle 30 (FIG. 2), at the opposite end.

Figure 2:
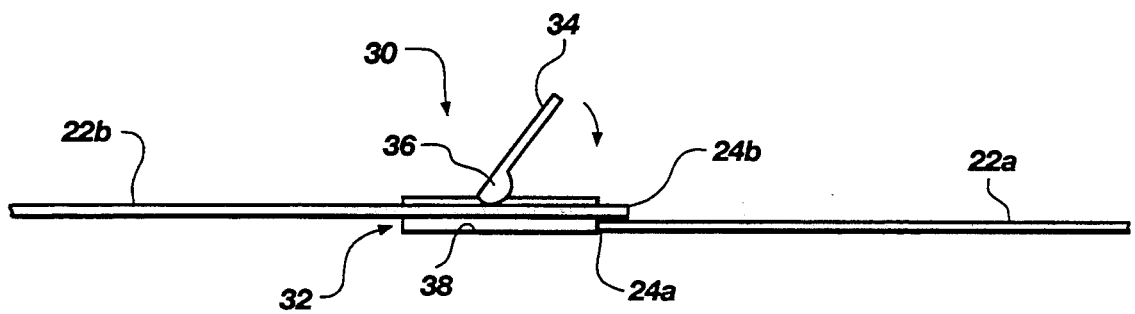
FIG. 2 shows a fragmented, side cross-sectional view of a cam buckle as used in the embodiment of the invention shown in FIG. 1.

Referring to FIG. 2, the cam buckle 30 is attached to the end 24a of a first piece 22a of the strap 22 and has a channel 32 for receiving an end 24b of a second piece 22b of the strap 22. A lever 34 with a cam 36 or some other projection is attached to the cam buckle 30 above the channel 32. When in use, the end 24b is slid into the channel 32 until the strap 22 is sufficiently taut. The lever 34 is then pressed toward the strap 22, and the cam 36 contacts the portion of the second piece 22b which is in the channel 32, forcing it against the base 38 of the cam buckle 30 and holding the second piece 22b firmly in place. Those skilled in the manufacture and various uses of straps will recognize the numerous different modifications that can be made to such a cam buckle 30 to achieve desired pressure limits, etc.

Figure 3:
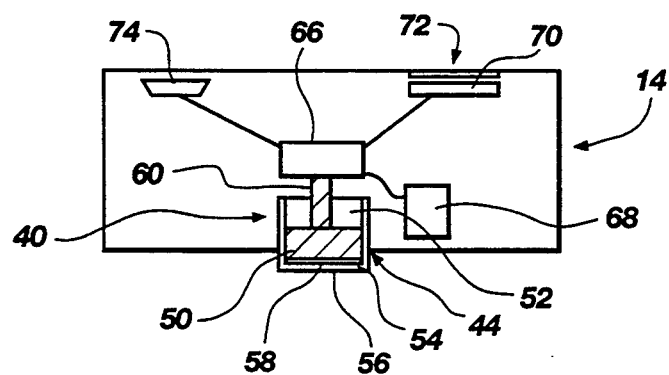
FIG. 3 shows a side cross-sectional view of the housing of the invention shown in FIG. 1.
Figure 4:
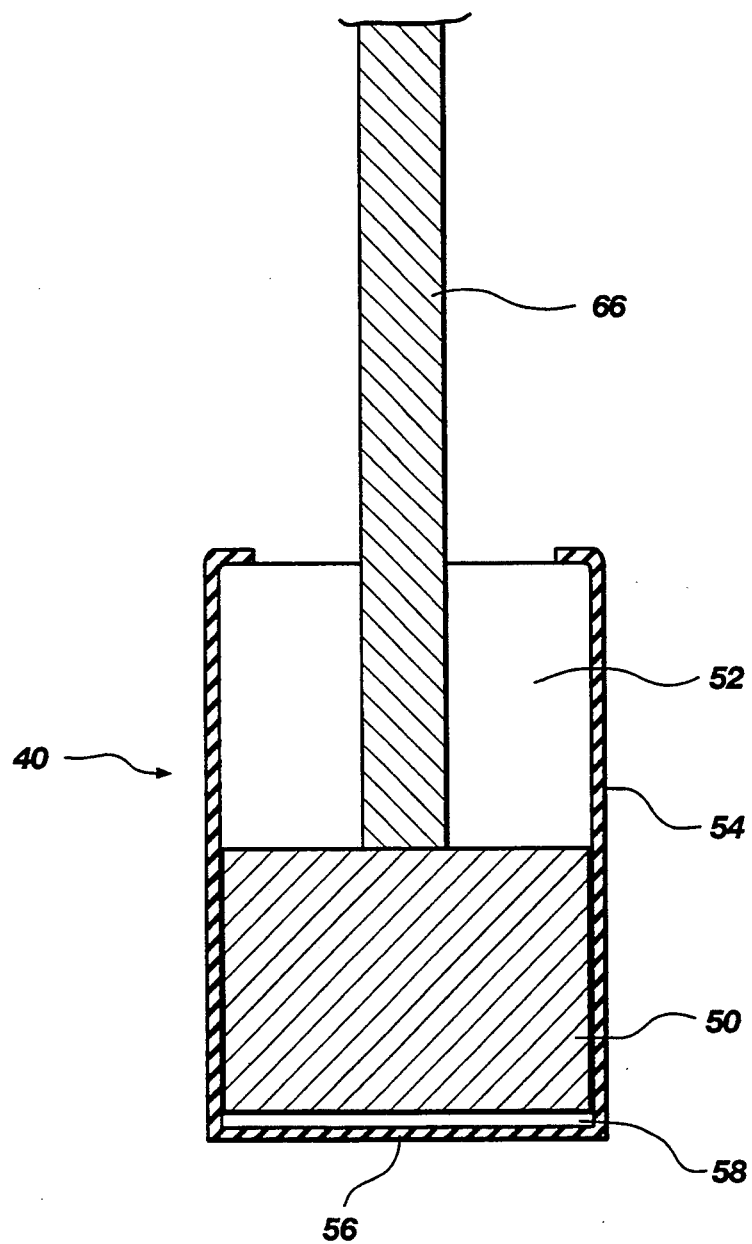
FIG. 4 shows a fragmented, top cross-sectional view of the ultrasonic transducer which may be employed in the various embodiments of the present invention.

Referring now to FIG. 3, the transducer housing 14 includes a transducer assembly 40, a portion of which extends out of an opening 44 on one side of the housing 14. An enlarged view of the transducer assembly is shown in FIG. 4. The transducer assembly 40 includes an ultrasonic transducer 50 and a base element 52 disposed on a rearward side of the transducer 50. As will be appreciated by those skilled in the art, the transducer 50 will be made of piezoelectric material or other material conventionally used for ultrasonic transducers. The base element 52 is made of any convenient support material such as plastic.

The transducer 50 and the base element 52 are covered with an elastomeric sleeve 54 which extends about the sides of the transducer 50 and the base element 52, over a forward side of the transducer 50 and partially covers a rearward side of the base element 50. The elastomeric sleeve 54 can be made of numerous elastomeric materials such as rubber, silicone or urethane. The elastomeric sleeve 54 has a face 56 which is positioned outside the housing 14 so as to firmly contact a reservoir when the indicator 2 is in place on the sidewall 6 of the reservoir 10 shown in FIG. 1. Preferably, the face 56 should be made of polyurethane, as polyurethane provides a superior transfer of the ultrasonic signal between the transducer 50 and the reservoir 10. The face 56 is adhesively attached to an epoxy layer 58 which, in turn, is attached to the forward side of the transducer 50. This epoxy layer 58 can serve as a "matching layer" to enhance the effectiveness of acoustic energy transmission from the transducer 50 into the reservoir (not shown). This is done by providing an epoxy layer 58 having a thickness which is an odd quarter of an ultrasonic signal wavelength thick. Thus, the thickness of the epoxy layer 58 is optimally $\frac{1}{4}$, etc. the wavelength of the ultrasonic signal. These thicknesses provide an optimal transfer of the ultrasonic signals. However, the epoxy layer 58 can be omitted, e.g. to reduce costs, and the transducer 50 would still operate satisfactorily.

A conductor cable 60 made of conventional materials extends through the base element 52 and connects the transducer assembly 40 to an electronic processing circuit 66 (FIGS. 3 and 4). The circuit 66 may utilize a conventional microprocessor or analog circuitry. A person skilled in the art of transducer assemblies will recognize the method of using either type of processing circuit and the relative advantages and disadvantages of each.

In use, the elastomeric facing 56 is firmly held against a sidewall of the reservoir 10 by the strap 22 (FIG. 1). The electronic processing circuit 66, powered by a power source, such as a battery 68, sends an electrical actuation signal to the transducer 50 through the cable 60. Preferably, this signal is high frequency A/C voltage. In response to the electrical actuation signal, the transducer 50 emits an ultrasonic signal through the epoxy layer 58 and elastomeric facing 56 into the reservoir. Because of the elastomeric facing 56, the ultrasonic signals pass into the reservoir 10 without the need for gel or other couplant, decreasing cost, mess and wasted time as the indicator is moved from one reservoir to another.

If there is liquid within the reservoir, some of the ultrasonic signals will reflect off the liquid/surface interface on an opposing sidewall 64 of the reservoir 10 (FIG. 1), and the reflected signals pass back through the liquid, elastomeric facing 56 and the epoxy layer 58, to stimulate the transducer 50. In response, the transducer 50 sends an electrical response signal through the cable 60 to the electronic processing circuit 66 (as shown in FIG. 3). The circuit 66 is either programmed or wired to monitor the signals by measuring the time between supply of the actuation signal to the transducer and the receipt back of the transducer's response signal. The return signal will occur within a predetermined time parameter, and the circuit 66 will actuate a visual display 70 or some other perceptible indicator, such as an audio signal generator 74, to inform the user that the liquid level is adequate. Alternatively, the circuit 66 could be programmed or wired to not emit any indication signals until the liquid level passes below the desired point.

If the liquid level has passed below the point along the reservoir at which the indicator 2 is placed, the lack of liquid can be measured by one of two different ways. First, because air is not an effective carrier of ultrasonic signals, signals will not effectively propagate into the reservoir 10, thus no energy or signal will reflect off the opposing portion 64 of the sidewall 6 of the reservoir 10 (shown in FIG. 1) as discussed above. Thus, the transducer 50 will not be stimulated by a return signal within the defined parameters and will not provide the response signal back to the circuit 66 within the same parameters as when the liquid level within the reservoir 10 is above the position of the indicator 2. When the signal is not returned within the proper time, the circuit 66 (shown in FIG. 3) is programmed or wired to an indicator signal activating a visual display 70 or some other perceptible indicator, such as an audio signal generator 74 so as to warn the user that the liquid in the reservoir is below the desired level.

The visual display 70, shown in FIG. 3, can be an LED, liquid crystal or similar display device. The housing 14 will likely contain a window 72 to protect the visual display 70 while allowing the user to see the display clearly. The audio signal generator 74 can utilize any of numerous commercially available audible signalling devices. Additionally, a volume control can also be added to control the volume of the audio signal.

Alternatively to the above mentioned method, the circuit 66 can be programmed or wired to respond to an early receipt of a response signal from the transducer 50 to the circuit 66. When a sidewall of a reservoir is covered with liquid, an ultrasonic signal sent into the sidewall from the side opposite the liquid will pass through the wall and into the liquid. When the opposing side of the sidewall is no longer covered in liquid, a detectible amount of the ultrasonic signal will be reflected back towards its source rather than entering the reservoir. Thus, when the transducer 50 sends an ultrasonic signal into an empty reservoir 10, it will be stimulated by a small reflected signal before a signal reflected off the opposing sidewall 64 could have returned. Therefore, the circuit 66 can also be programmed or wired to send an indication signal when it detects a response signal from the transducer 50 prior to the time parameters of a signal reflected off the opposing sidewall 64 of the reservoir 10.

While the integrated housing 14, represented in FIG. 3, is a preferred embodiment of the indicator 2, the transducer assembly 40 need not be contained within a housing containing the circuit 66 and the signal indicators 70, 74. For example, the transducer assembly 40 can be connected to an elongate conductor cable 160 such as that shown in FIG. 5. The conductor cable 160 connects to a monitor 168 such as that shown in FIG. 5. The monitor 168 can contain the electronic processing circuit (not shown), as well as the visual display 170 and the audio signal generator 174 for generating a perceptible audio alarm. The separate monitor 168 allows for the indicator 2 to use a conventional A/C voltage line 176 rather than a battery, as shown in FIG. 3. Additionally, the separate monitor 168 could easily be modified to monitor several reservoirs and contain a display for each reservoir.

Figure 5:
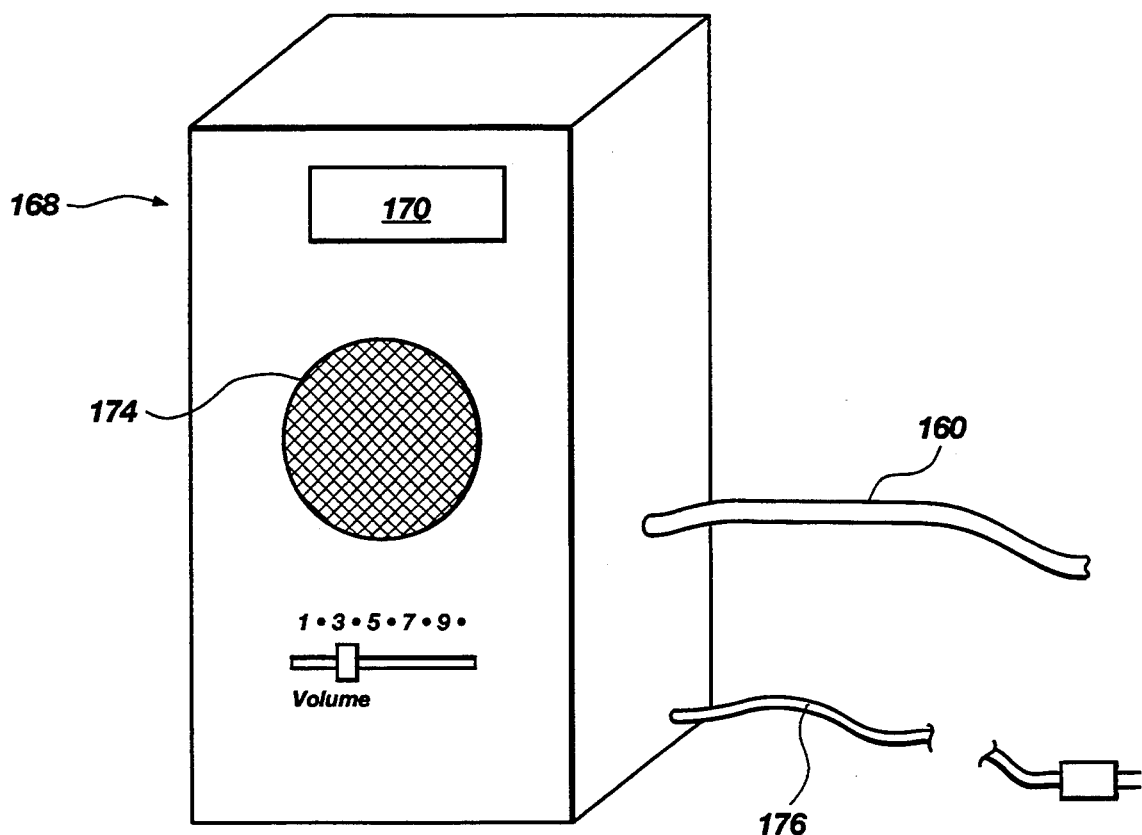
FIG. 5 shows a perspective view of a monitor as could be used with the various embodiments of the present invention.
Figure 6:
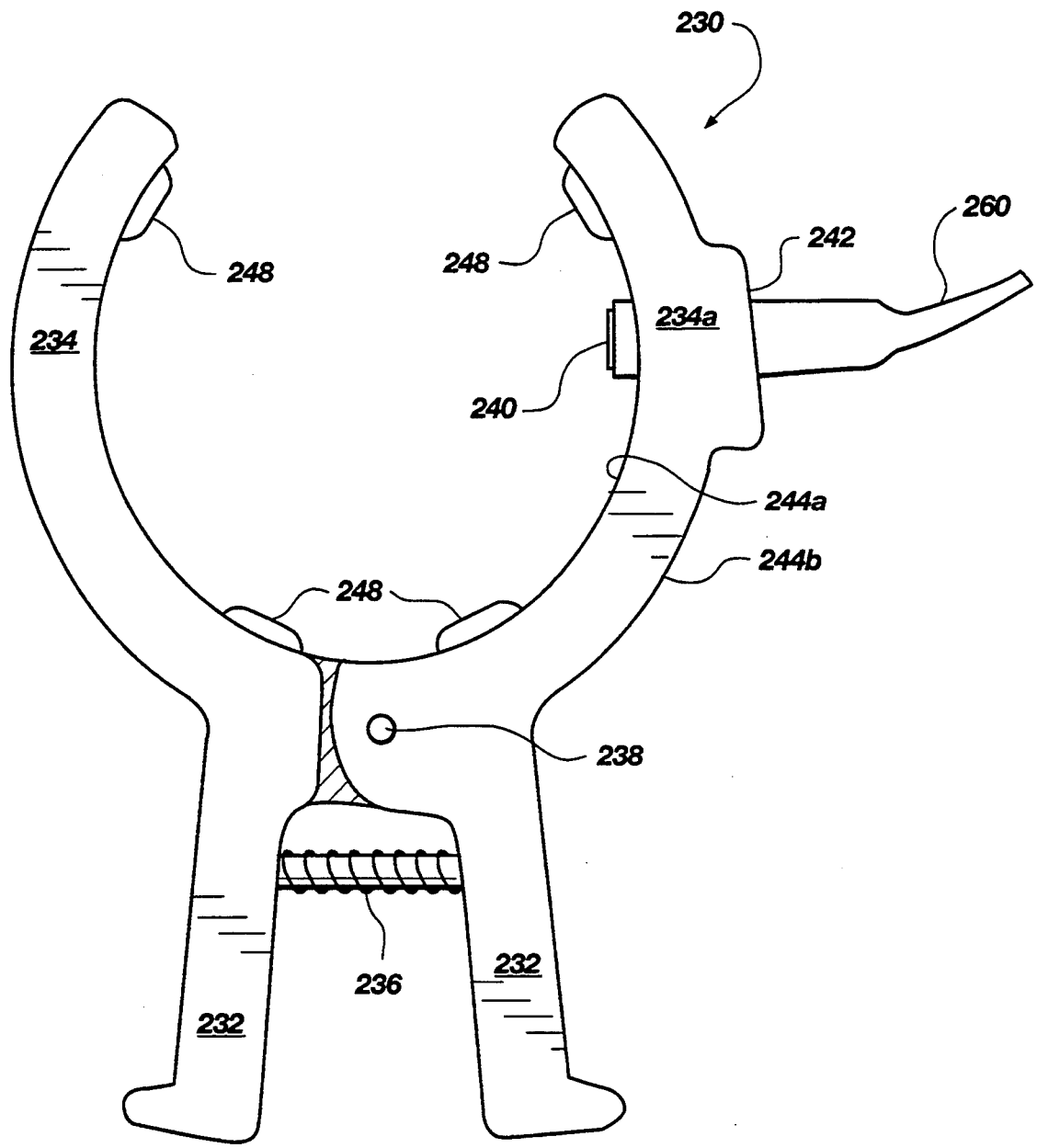
FIG. 6 shows a plan view of another embodiment of the present invention.

When using the detached monitor 168 shown in FIG. 5, the transducer assembly (not shown in FIG. 5) can be adjustably held against the reservoir in several different ways. For example, FIG. 6 shows another embodiment in which the transducer assembly 240 is positioned along a reservoir (not shown) by a clamp 230 having two handles 232 and two arms 234–234a. The handles 232 are pivotally attached so that movement of the handles closer to one another causes the arms 234–234a to move away from each other. The clamp 230 also comprises a biasing force positioned such that when no external pressure is placed on the handles 232, the handles are forced apart and the arms 234–234a are forced into a closed position. As demonstrated in FIG. 6, this is accomplished by a hinge 238 serving as the pivotal attachment and a spring 236 positioned between handles 232 provides the biasing force. The preferred size of the hinge 238 and spring 236 will depend largely on the size of the clamp 230.

The arms 234–234a of the clamp have interior, concave walls 244a, and exterior, convex walls 244b. On the interior, concave walls 244a is attached a plurality of gripping elements 248. The gripping elements are preferably made from elastomeric materials, such as silicone, polyurethane, or rubber, so that they will grip glass, metal and other smooth surfaces. As the spring 236 forces the arms 234–234a into a closed position, the gripping elements 248 come into firm contact with a liquid accommodating reservoir, such as reservoir 10 in FIG. 1. The position of the clamp 230 along the reservoir can be adjusted by applying pressure to the handles 232 in a direction opposite to the force of the spring 236. Once the gripping elements 248 are no longer in forceful contact with the reservoir, the clamp 230 can be moved to another position along the reservoir.

Located within one arm 234a of the clamp 230 is a receptacle 242 for securely holding the ultrasonic transducer assembly 240. When the clamp 230 closes about a reservoir, such as reservoir 10 of FIG. 1, the transducer assembly 240 is held firmly against the sidewall of the reservoir. An elongate conductor cable 260 extends from the transducer assembly 240 to a monitor such as that shown in FIG. 5. The cable 260 conveys the actuation and response signals between the transducer assembly 240 and electronic processing circuit (not shown in FIG. 6) in the same manner described above. A change in the timing of the response signal from the transducer assembly 240 to the circuit is signaled to the visual display 170 and/or audio signal generator 174 on the monitor 168 (FIG. 5).

Figure 7:
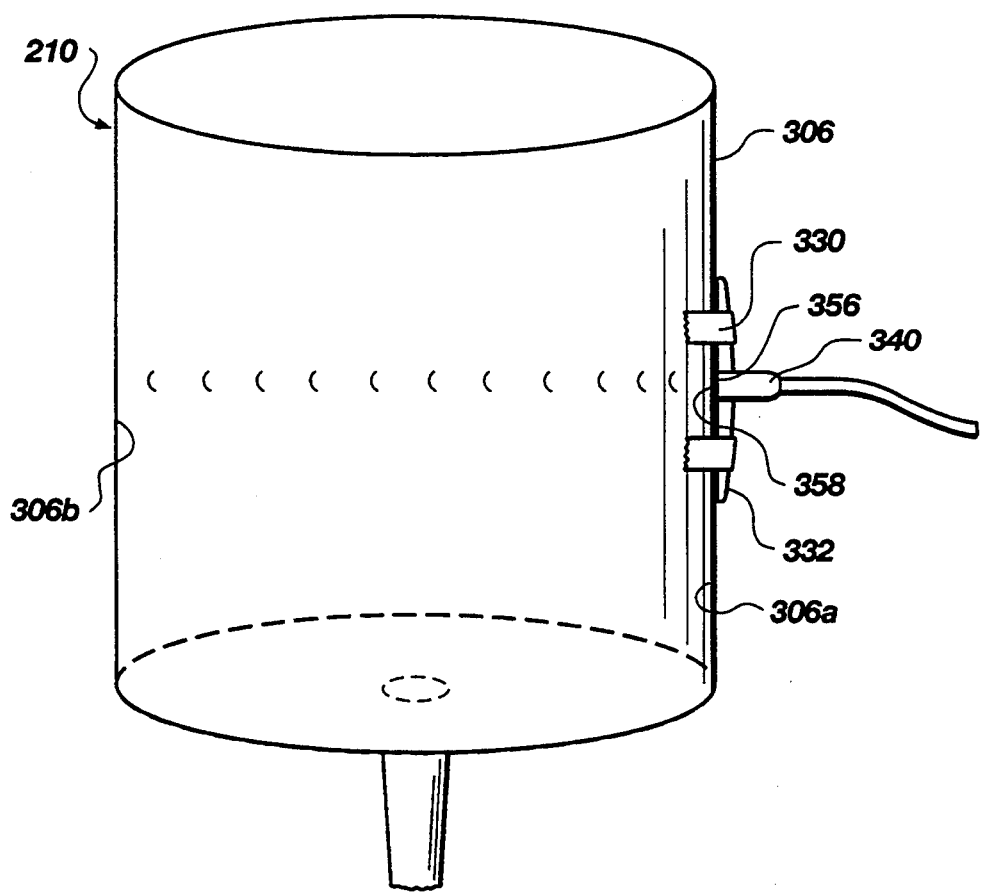
FIG. 7 shows a fragmented perspective view of an additional embodiment of the present invention, attached to a liquid-containing reservoir.

FIG. 7 shows yet another embodiment of the present invention attached to a sidewall 306 of a reservoir 310. An ultrasonic transducer assembly 340, made in a manner described above, is attached to the sidewall 306 by means of removable strips of adhesive 330, such as tape. Attachment of the adhesive 330 to the transducer assembly 340 can be facilitated by adding a flange 332 or some similar device to sides of the transducer assembly 340. The transducer assembly 340 is positioned in such a way as to keep a side 358 of the elastomeric facing layer 356 in intimate contact with and parallel to a sidewall portion 306a of the reservoir 310 so that the transducer assembly 340 can receive signals reflected off an opposing sidewall portion 306b. As discussed earlier, the electronic processing circuit (not shown in FIG. 7) can also be programmed or wired to indicate when return signals are received off the adjacent sidewall 306a, indicating that the liquid level has fallen below the position of the transducer assembly 340.

In some instances, it may be desirable for the adhesive material 330 to be removable so that the transducer assembly 340 can be used with different reservoirs, or placed at varying positions along a reservoir at different times during use. The ultrasonic transducer assembly 340 will almost always be attached to a monitor which contains the electronic processing circuit and displays such as that shown in FIG. 5.

Figure 8:
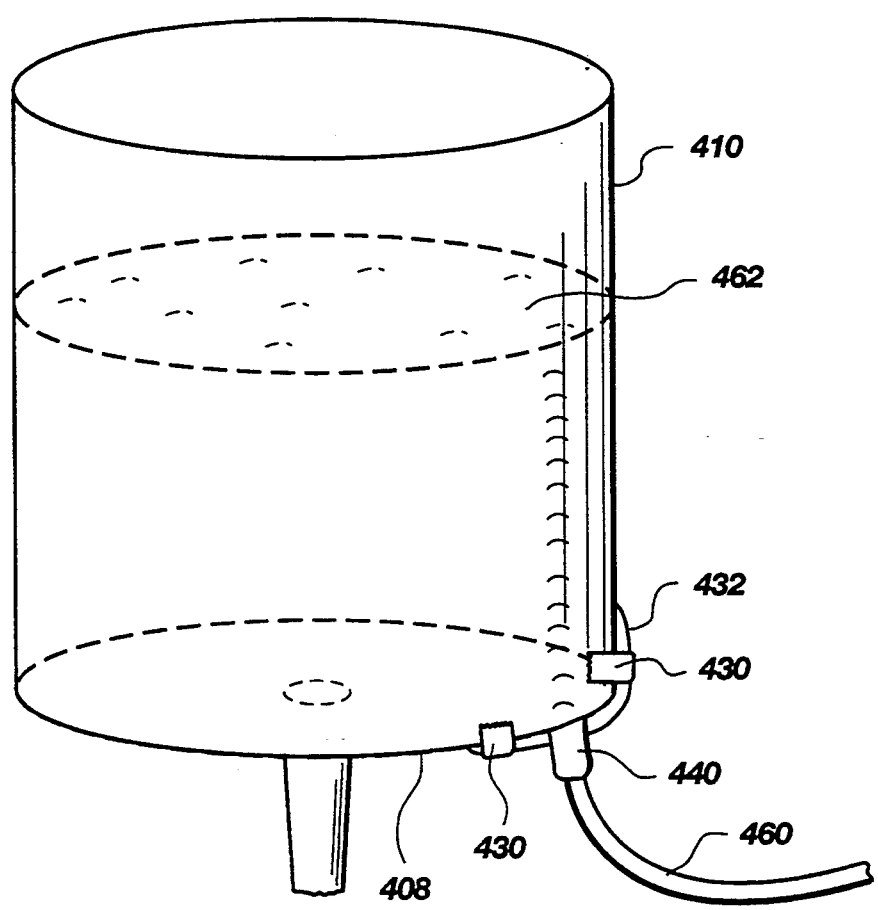
FIG. 8 is a fragmented perspective view of yet another embodiment of the present invention, attached to a liquid-containing reservoir.

FIG. 8 shows an additional embodiment of the invention attached to an underside 408 of the reservoir 410. As in FIG. 7, strips of adhesive material 430, such as tape, are used to secure the transducer assembly 440 to the reservoir 410 in such a way as to keep the elastomeric facing layer (not shown) in intimate contact with and relatively parallel to the underside 408 of the reservoir 410. Such an adhesive attachment can be facilitated by adding one or more flexible flanges 432 extending from the transducer assembly 440 and attaching the adhesive strips 430 to the flanges 432 as shown in FIG. 8.

Rather than measuring when a liquid has fallen below some desired horizontal point, the ultrasonic transducer assembly 440 of the instant embodiment ultrasonically measures the height of the liquid in the reservoir 410. An actuation signal is sent from the electronic processing circuit (not shown in FIG. 8), through the cable 460, to the transducer positioned in the transducer assembly 440. In response, the transducer emits an ultrasonic signal into the reservoir 410. The ultrasonic signal travels through the liquid in the reservoir 410 and is reflected off of a liquid-surface interface 462 between the liquid in the reservoir and the air above it. The reflected signal travels through the liquid, and into the transducer, stimulating the transducer to send a response signal through the cable 460 to the electronic processing circuit in the same manner as discussed above. As the liquid level falls, the time between emission of the actuation signal and receipt of the response signal decreases. Thus, the circuit can be programmed or wired to monitor the response signal and to send an indication signal to a visual display or audio signal generator when the response signal is received before a specified time, thereby indicating that the liquid level has passed below a predetermined desired level.

In the manner described, a noninvasive ultrasonic liquid level indicator is provided. It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A level indicator for indicating the level of a liquid in a reservoir having at least a bottom wall and side walls with interior and exterior surfaces, comprising:
    ultrasonic transducer means for producing ultrasonic signals and for receiving reflected signals thereof, said transducer means including,
        a transducer element having a forward transmitting side and lateral sides, and an elastomeric sleeve having a face at one end disposed adjacent to the forward side of the transducer element for surrounding at least said forward side of the transducer element, and for coupling against the exterior surface of the reservoir,
    means for holding the transducer means at selectable locations against an exterior surface of the side walls of the of the reservoir with the face of the elastomeric cover in firm contact therewith so that ultrasonic signals produced by the transducer means are transmitted into the reservoir and reflected back from a liquid-surface interface to be received by the transducer means, said holding means comprising a housing means,
    monitor means disposed within the housing means for measuring the time between production of ultrasonic signals and receipt thereback of reflected signals by the transducer means, and for producing an indication signal indicating when receipt of the reflected signals does not occur within a defined time parameter, and
    indication means within said housing means and adjacent said monitor means responsive to receipt of the indication signal from the monitor means for producing a human discernable signal indicating that the liquid level has passed below a desired level at one of the selectable locations.

2. The level indicator of claim 1 wherein the face of the elastomeric sleeve comprises polyurethane.

3. The level indicator of claim 2 wherein the elastomeric sleeve extends along the lateral sides and around at least a portion of a back side of the transducer element so as to substantially enclose the transducer element.

4. The level indicator of claim 2 further comprising an epoxy layer for adhesively attaching the elastomeric sleeve to the forward side of the transducer element.

5. The level indicator of claim 4 wherein the epoxy layer is an odd quarter wavelength thick.

6. The level indicator of claim 1 wherein the holding means comprises a strap means connected to the housing means for wrapping about the reservoir and for holding the transducer means against the exterior surface of the reservoir.

7. The level indicator of claim 6 wherein the strap means comprises an elongate strap for wrapping about the reservoir and adjustment means for tightening the strap about the reservoir.

8. The level indicator of claim 7 wherein the strap means comprises first and second pieces, each piece having a first end and a second end, and wherein the adjustment means further comprises a cam buckle attached to a second end of said first piece.

9. The level indicator of claim 6 wherein said housing means includes an opening in one side thereof through which a portion of the transducer means extends to contact the exterior surface of the reservoir.

10. A level indicator for indicating the level of a liquid in a reservoir having at least a bottom wall and side walls with interior and exterior surfaces, comprising:
    ultrasonic transducer means for producing ultrasonic signals and for receiving reflected signals thereof, said transducer means including
        a transducer element having a forward transmitting side and lateral sides, and an elastomeric cover for surrounding at least the forward side of the transducer element, said elastomeric cover having a face at one end adjacent to the forward side of the transducer element, for coupling against the exterior surface of the reservoir,
    means for holding the transducer means at selectable locations against an exterior surface of the side walls of the reservoir in firm contact so that ultrasonic signals produced by the transducer means are transmitted into the reservoir and reflected back from a liquid-surface interface to be received by the transducer means, said holding means comprising:
        a clamp having spaced-apart first and second arms movable towards and away from one another and biased toward one another for clamping about the side walls of the reservoir, the clamp including a means for holding the transducer means in contact with the reservoir side walls when the clamp is clamped about the side walls,
    monitor means coupled to the transducer means for measuring the time between production of ultrasonic signals and receipt thereback, if any, of reflected signals by the transducer means, and for producing an indication signal indicating when receipt of the reflected signals does not occur within a defined time parameter, and
    indication means for receiving the indication signal from the monitor means and warning that the liquid level has passed below a desired level.

11. The level indicator of claim 10 wherein the arms of the clamp are generally C-shaped, the clamp further comprising, first and second handles disposed at one end of the first and second arms, respectively, said arms being pivotally joined so that when the handles are moved toward one another, the arms are caused to pivot apart, and biasing means disposed between the handles for forcing the handles apart when no external pressure is asserted against the handles to thereby force the arms towards one another.

12. The level indicator of claim 10 wherein the clamp further comprises a plurality of gripping elements spaced apart on the arms so as to contact the side walls of the reservoir when the clamp is clamped about the side walls.

* * * * *